(12) United States Patent
Zhou

(10) Patent No.: US 6,219,417 B1
(45) Date of Patent: Apr. 17, 2001

(54) RING TRIP DETECTION IN A COMMUNICATION SYSTEM

(75) Inventor: Yan Zhou, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/870,893

(22) Filed: Jun. 6, 1997

(51) Int. Cl.[7] ................................. H04M 3/00
(52) U.S. Cl. .................. 379/377; 379/382; 379/399; 379/413
(58) Field of Search .................. 379/382, 412, 379/413, 377, 373, 379, 418, 252, 399; 381/57

(56) References Cited

U.S. PATENT DOCUMENTS

| 5,054,078 | * | 10/1991 | Schorman et al. | 381/57 |
|---|---|---|---|---|
| 5,323,460 | * | 6/1994 | Warner et al. | 379/399 |
| 5,402,482 |   | 3/1995 | Minohara et al. | 379/377 |
| 5,583,934 | * | 12/1996 | Zhou | 379/399 |
| 5,619,567 | * | 4/1997 | Apfel | 379/413 |
| 5,636,273 | * | 6/1997 | Schopfer et al. | 379/412 |
| 5,684,874 | * | 11/1997 | Yagyu et al. | 379/377 |
| 5,706,342 |   | 1/1998 | Baeder et al. | 379/382 |
| 5,734,712 | * | 3/1998 | Randahl | 379/377 |
| 5,796,815 | * | 8/1998 | Guercio et al. | 379/377 |

* cited by examiner

Primary Examiner—Forester W. Isen
Assistant Examiner—Jacques M. Saint-Surin
(74) Attorney, Agent, or Firm—Skjervon, Morrill, MacPherson, Franklin & Friel, LLP; Kent B. Chambers

(57) ABSTRACT

A line card integrates subscriber line interface circuitry, A/D and D/A converters, and digital signal processing technology. The digital signal processing technology performs many line card tasks such as switch hook detection, ground key detection, DC feed control, polarity reversal, ringing tests, fault detection, power cross detection, and ring trip detection. A line card having a digital signal processor supports both integral and external ringing signal generators. During application of a ringing signal, the line card detects ring trip conditions while discriminating against short duration short circuits. The line card includes programmable features that facilitate adaptation to varying regional ring trip detection and short duration short circuit discrimination specifications and subscriber loop characteristics.

31 Claims, 10 Drawing Sheets

RING TRIP DETECTION IN A COMMUNICATION SYSTEM

BACKGROUND OF THE INVENTION

1. Field of the Invention

This invention relates to communication systems and particularly to ring trip detection with short duration short circuit discrimination.

2. Description of the Related Art

Communication systems utilizing transmission lines such as subscriber loops are commonplace throughout much of the world. Subscriber loops are terminated on one end by terminal equipment and provide a path for the terminal equipment to communicate with other terminal equipment via, for example, a vast network of central offices, private branch exchanges, satellite relay systems, transmission lines, repeaters, and wireless systems. FIG. 1 illustrates a portion of a conventional subscriber loop communication system 100. The subscriber loop 102 is modeled as a balanced two-wire transmission line 103, with loop resistances R and inductances L and leakage impedance modeled by capacitor 104 and resistor 106. The subscriber loop 102 is terminated on respective ends by terminal equipment 110 and a central office 122 line card 120. The subscriber loop 102 provides a communication path for information transmission such as voice signals and signaling information between a subscriber's terminal equipment and the central office 108.

Terminal equipment 110 is illustratively modeled as a telephone with off-hook resistance 112, nominally 200 ohms, and ringer impedance Z, which may be modeled, for example, as a series RC or series RLC circuit. Terminal equipment 110 includes a switch hook 118 which loads the subscriber loop 102 on the subscriber end with resistance 112 when the terminal equipment 110 is off-hook (as shown) and loads subscriber loop 102 with ringer impedance Z when the terminal equipment 110 is on-hook. Terminal equipment 110 may be any of a variety of devices besides the familiar, ubiquitous telephone such as facsimile machines, private branch exchanges, voice mail systems key telephone systems, computers, modems, telephone answering machines, alarm systems, and radio control systems, as well as many other devices.

The other end of the subscriber loop 102, opposite terminal equipment 110, converges on line card 120 of central office 122. The line card 120 terminates subscriber loop 102 at conductors A (Tip) and B (Ring) with a feed impedance of 900 ohm or other standard feed impedance. The line card 120 provides a gateway to the public switched telephone network (PSTN) through switching network 124.

Referring to FIG. 2, the subscriber line interface circuit (SLIC) 202 of line card 120 provides a two-wire interface 204 to the generally analog signal carrying subscriber loop 102. The SLIC 202 performs a variety of interface functions that allow terminal equipment 110 to communicate with other terminal equipment (not shown). The SLIC 202 and the subscriber loop audio-processing circuit (SLAC) 206 carry out the well-known BORSCHT (Battery feed, Overvoltage protection, Ringing, Supervision, Coding, Hybrid, and Test) functions. The SLIC 202 monitors direct current (DC) levels on the subscriber loop 102 with ground key detector circuitry 208 and off-hook detector circuitry 210. Input decoder and control circuitry 214 provides a mechanism for other circuitry (not shown) in the central office 122 and for SLAC 206 to control such SLIC 202 functions as subscriber loop 102 activation, ringing, and polarity reversal. Analog two-wire interface 204 and signal transmission circuitry 212 cooperate in sensing subscriber loop 102 metallic voltage (voltage at conductor A minus voltage at conductor B or Vab) while generally having a high rejection of longitudinal voltages (Vab_long). Alternating current (AC) signals, such as voice signals, are transmitted over subscriber loop 102 to terminal equipment 110 by two-wire interface 204 and signal transmission circuitry 212 in response to voice information input signals received from central office 122 through SLAC 206.

The power feed controller 222 includes a battery feed circuit and a polarity reversal circuit. The battery feed functions supply direct current from a central office battery (not shown) to the subscriber loop 102 through balanced feed resistances at conductors A and B. Loop current is generally limited to no more than 45 to 75 milliamperes (mA) in a low-resistance subscriber loop. Higher subscriber loop resistances generally result in lower subscriber loop current. The on-hook subscriber loop powering voltage is typically the battery voltages minus 48 Volts DC (Vdc) less any overhead voltage, typically about 4 Vdc, necessary to prevent SLIC 202 saturation. Battery feed specifications are regionally provided and conform with specifications provided by, for example, BELLCORE, the Electronic Industries Association (EIA), British Telecom, and the International Telegraph and Telephone Consultative Committee (CCITT).

The SLAC 206 generally filters and converts analog output signals received from SLIC 202 into digital signals (A/D), processes the signals in accordance with control and timing information, and compresses the digital signals. The pulse code modulation (PCM) interface 220 provides PCM signals to the central office 122. SLAC 206 also receives digital input signals from the central office 122 via PCM interface 220, expands the digital input signals, process the signal in accordance with control and timing information, and converts the digital signals into analog signals (D/A) for input to SLIC 202. Additional information on SLICs and SLACs is found in the 1995 Advanced Micro Devices of California data book entitled "Linecard Products for the Public Infrastructure Market."

Referring to FIGS. 1 and 2, when a call is directed to terminal equipment 110, the ring relay driver 216 activates a relay 126 which connects a central office 122 ringing AC voltage generator 128 and DC bias source 130 to subscriber loop 102. The AC voltage generator 128 supplied ringing voltage generally varies from a nominal 105 Vac at 16 Hz to 140 Vac at 66 ⅔ Hz. The DC bias source 130 biases the ringing voltage with a DC voltage of between 48 Vdc and 105 Vdc. Additionally, line circuit 120 may provide an integral (internally generated) ringing voltage signal to subscriber loop 102. While terminal equipment 110 is on-hook, switch hook 118 connects subscriber loop 102 across the ringer impedance Z (FIG. 1). The ring trip detector 218 detects an off-hook condition of terminal equipment 110 while the ringing voltage is being applied by detecting the DC current change generated by the closing of subscriber loop 102 across resistance 112 and the DC bias source 130. The ring trip detector 218 must initiate cessation of the ringing voltage signal application to subscriber loop 102 within a predetermined amount of time after an off-hook event, which is generally between 150 and 200 ms. Furthermore, some geographical regions require discriminating between short duration short circuits which may also cause a current while the ringing signal is applied to subscriber loop 102.

A low pass filter (not shown) is generally used to detect the off-hook current change while discriminating against the AC ringing voltage. However, discriminating against the short duration short circuit is a nontrivial task for the low pass filter. A sudden current change due to a short duration short circuit will cause the output waveform of the low pass filter to slowly rise. After cessation of the short circuit, the low pass filter output waveform will slowly decay. The decay time may exceed the maximum time allotted to detect an off-hook condition, and, thus, the short duration short circuit may be detected by ring trip detector 218 in error as an off-hook condition. The low pass filter may be tuned to successfully meet off-hook detection and short duration short circuit discrimination requirements for some subscriber loops. However, generically tuning a low pass filter to accommodate the widely varying subscriber loop impedance variations is at least a difficult task and may require an extensive amount of work to achieve.

Also, analog circuitry often suffers from well-known aging side effects such as instability and circuit parameter drifting which may affect long-term reliability. Moreover, analog circuit features in an integrated circuit are large, presently in general on the order of about 7 $\mu$m, which increases costs of analog integrated circuitry. Furthermore, providing a cost efficient common hardware platform which lends itself to cost effective modifications to conform with various regional standards and operating environments is at least a difficult problem.

SUMMARY OF THE INVENTION

In one embodiment, a communication system line card employs the precision and stability of digital signal processing technology with the flexibility of software to provide reliable and adaptable interfacing to one or more subscriber loops. A central office generally communicates and processes digital signals. Digitally processed signals are made directly available to the central office and the line card which in at least one embodiment enhances the overall capabilities and efficiencies of the communication system by, for example, efficiently allocating processing resources and control functions. The line card reliably discriminates against short circuits of a predetermined duration while accurately detecting true off-hook conditions within a predetermined amount of time. In one embodiment, the line card compares detected current changes against a predetermined threshold where the threshold is chosen to discriminate against ringing voltage current changes. The line card removes subscriber loop current input data from the input of a low pass filter for a predetermined time sufficient to meet any applicable short duration short circuit discrimination requirements. In one embodiment, the low pass filter is an infinite impulse response (IIR) filter, and the state variables are reset to force the IIR filter output to zero. After the predetermined time, the low pass filter input is allowed to again receive subscriber loop current input data.

In one embodiment of the present invention, a method includes the steps of sampling a signal at a time, t0, and at a later time, t1, comparing any change between an attribute of the signal sampled at time t0 and the attribute in the signal sampled at time t1 to a first predetermined threshold value, and if any change in the compared signal attribute exceeds the first predetermined threshold, preventing processing of the signal for at least a predetermined amount of time.

In another embodiment of the present invention, a method of detecting a ring trip in a communication system with subscriber loop short circuit discrimination includes the steps of applying a ringing signal including a direct current bias voltage to a subscriber loop of the communication system and detecting a current signal change in the subscriber loop. The method further includes the steps of determining if the detected current signal change exceeds a first predetermined threshold during a predetermined amount of time, if the current signal exceeds the first predetermined threshold, preventing the current signal from being filtered by a low pass ring trip detection filter for a predetermined amount of time, and after the predetermined amount of time and if the current signal does not exceed the first predetermined threshold, determining if the current signal exceeds a second predetermined threshold.

In a further embodiment of the invention, a communication system includes circuitry for sampling signal data of a signal on a subscriber loop at a time, t0, and at a later time, t1. The communication system further includes a line card having a processor and a memory, the memory storing code for execution by the processor, the code including instructions for processing the signal data with a low pass filter to substantially remove an alternating current signal component from the signal data, for detecting a ring trip on the subscriber loop, for detecting a short duration short circuit at the subscriber loop, and for preventing processing of the signal data with the low pass filter if a short duration short circuit at the subscriber loop is detected.

BRIEF DESCRIPTION OF THE DRAWINGS

Features appearing in multiple figures with the same reference numeral are the same unless otherwise indicated.

DETAILED DESCRIPTION

The following description of the invention is intended to be illustrative only and not limiting.

Figure 3:
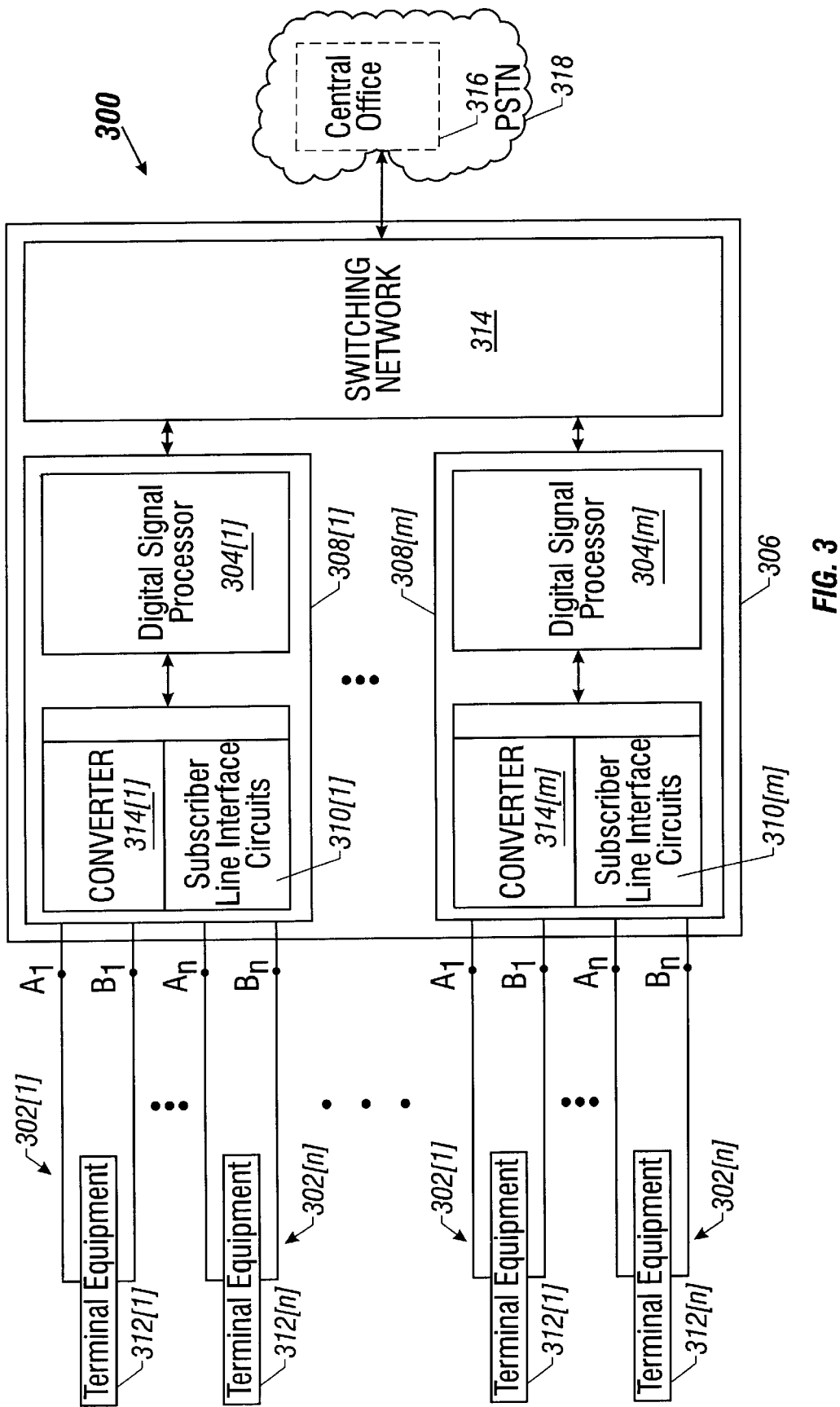
FIG. 3 illustrates a communication system having a line card employing a digital signal processor.

Referring to FIG. 3, in the communication system 300, each of the line cards 308[m] through 308[1] (308[m:1]) integrates analog data sensing and driving circuitry of SLICs 310[m:1], respectively, with programmable digital signal processors 304[m:1], respectively. Thus, the line cards 308 [m:1] deliver adaptability through programmability and long-term precision with digital signal processing circuitry stability in digital signal processors 304[m:1]. Thus, line cards 308[m:1] are well suited to assume functionality conventionally tasked to analog SLIC circuitry. Furthermore, the digital signal processing circuitry integrated circuit features are generally much smaller than analog circuit features and may be on the order of, for example, 0.25 μm which decreases the cost of line cards 308[m:1] relative to any analog signal processing features.

One important fUnction is the subscriber loop ring trip detection function. The line card 500 may generate ringing signals internally (integral ringing), and line card 500 may direct a ring relay (not shown) to switch in an external AC ringing generator 402 and DC bias generator 404 from central office 306. When external ringing is initiated, conductor A of subscriber loop 406 is switched by line card 500 to ground through 50 ohm resistor Rt. An amplifier 408 of a subscriber line interface circuit 310[x], which represents each of respective subscriber line interface circuits 310 [m:1], senses the voltage across 510 ohm ring feed resistor Rgfd and develops an output data signal representing the loop current, I_loop, in subscriber loop 406. I_loop is converted into digital data by converter 314[x] and provided to digital signal processor 304[x]. When switch hook 410 is off-hook, I_loop flows through transmission line 412, illustrative ringer impedance Zr, and through resistor Rt to ground. When integral ringing is generated, subscriber line interface circuits 310[m:1] generate metallic currents in subscriber loop 406 to cause terminal equipment 414 to ring.

Line cards 308[m:1] accurately detect ringing signals from both integral and external ringing signal generators within typical specified detection time requirements. Furthermore, line cards 308[m:1] discriminate against short circuits of t ms duration at each of the respective connected subscriber loops 302[n:1], where 't' is programmable to meet any regional requirements. Ring trip detection may be implemented in each of line cards 308[m:1] as circuitry or as a computer program that provides flexibility to meet varied requirements.

Figure 1:
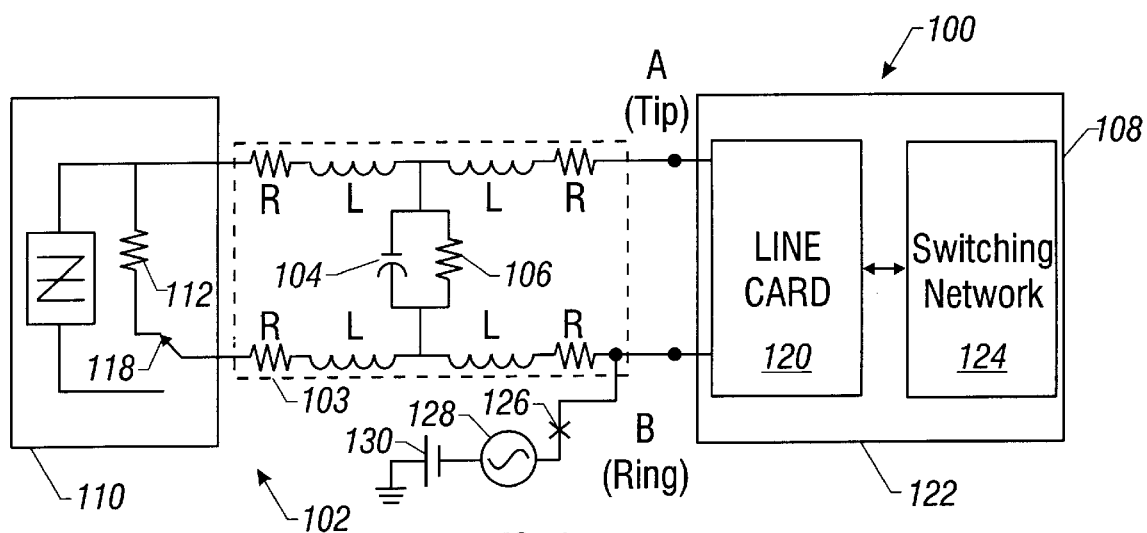
FIG. 1, labeled prior art, illustrates a subscriber loop terminated by subscriber terminal equipment and central office equipment.
Figure 2:
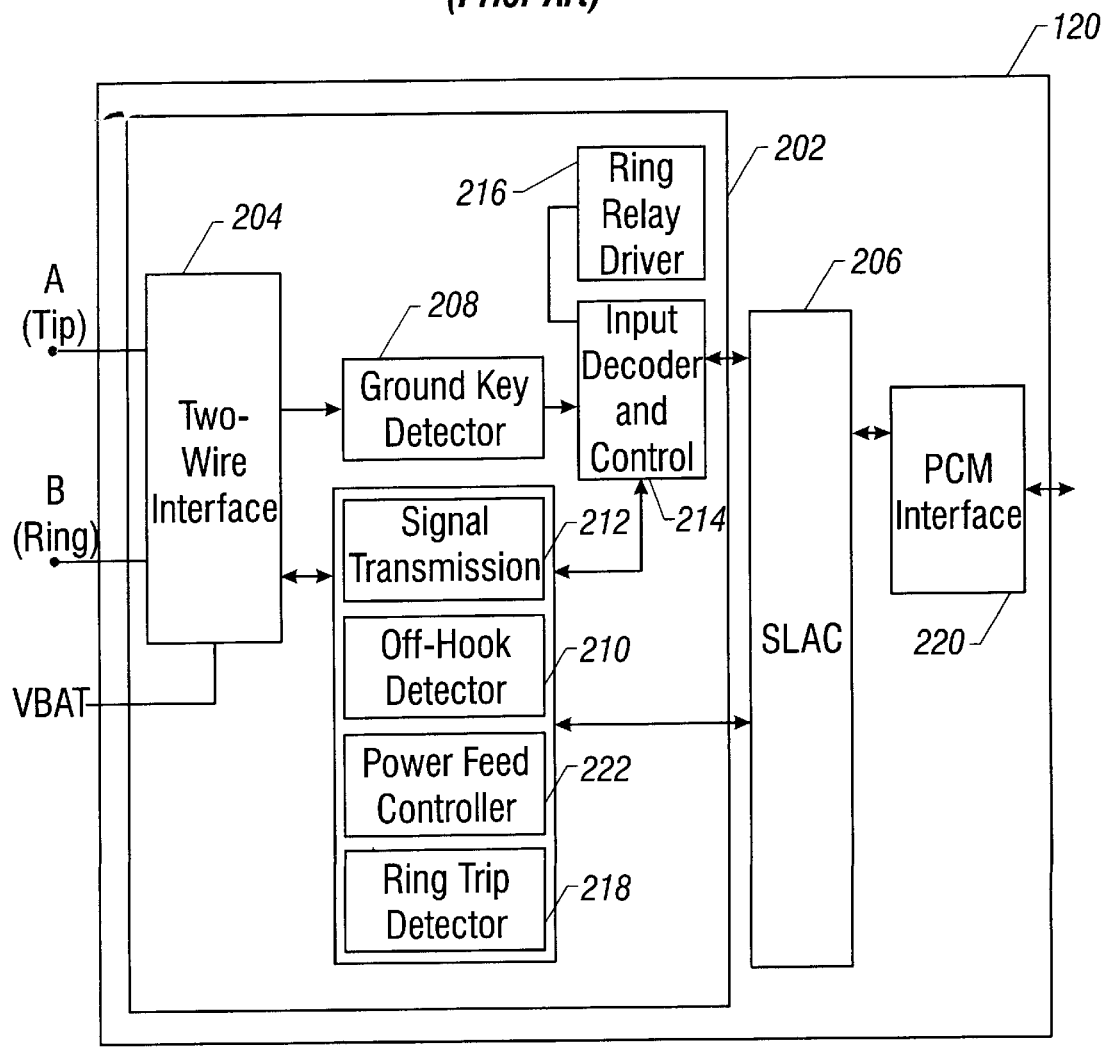
FIG. 2, labeled prior art, illustrates a line card of the central office equipment of FIG. 1.

Referring to FIG. 3, "m" line cards 308[m:1] may be located in a central office 306, and each of line cards 308[m:1] may support "n" subscriber loops 302[n:01] (also referred to as "channels") where "m" and "n" are integers and "n" may vary from line card to line card. Each of subscriber loops 302[n:1] may be modeled as subscriber loop 102 or modeled in accordance with other transmission line models, and each of the terminal equipment 312[n:1] may be represented by devices such as terminal equipment 110. Each of SLICs 310[m:1] includes "n" subscriber line interface circuits. When ringing signals are applied to subscriber loops 302[n:1], a central office 306 ring generator and DC bias source may be applied to either the A or B conductor through a ring relay as shown in FIG. 1. Additionally, line cards 308[m:1] preferably include an integral ring generator that is particularly useful for low impedance subscriber loops 302[n:1] such as in a private branch exchange.

Line cards 308[m:1] include SLICs 310[m:1] which sense subscriber loop parametric information such as actual DC line voltage Vab_DC, and AC line signal voltage Vab_AC across conductors A and B. Line current data, Ia and Ib at conductors A and B, respectively, are generally sensed by SLICs 310[m:1] through external balanced feed resistors (not shown). SLICs 310[m:1] also drive DC feed current, integral ringing signals, signaling transmissions, and other data onto subscriber loops 302[n:1], respectively. When external ringing signals are applied to subscriber loops 302[n:1], the respective drivers of SLICs 310[m:1] are taken off-line. When DC feed or DC bias current is flowing into the A conductor from SLICs 310[m:1] and out of the B conductor to respective SLICs 310[m:1], Ia equals the DC feed or DC bias current minus any longitudinal current, I_long, and Ib equals the DC feed or DC bias current plus I_long. When the DC feed current is reversed during polarity reversals, Ia equals the DC feed or DC bias current plus I long, and Ib equals the DC feed or DC bias current minus I_long. Thus, for balanced subscriber loops 302[n:1], Ia minus Ib equals the metallic current, Iab_met or Imt, in respective subscriber loops 302[n:1] regardless of the polarity of conductors A and B, and Ia plus Ib equals along.

Converters 314[m:1] are two-way communication links between respective digital signal processors 304[m:1] and corresponding analog SLICs 310[m:1]. Each of SLICs 310 [m:1] provides analog data signals to a respective digital signal processor 304[m:1], and the digital signal processors 304[m:1] provide digital control and information data signals through D/A converters to the SLICs 310[m:1], respectively. The converters 314[m:1] sample signals, such as the parametric information sensed by SLICs 310[m:1], and perform A/D conversions which allow the analog SLICs 310[m:1] and respective digital signal processors 304[m:1] to communicate with each other. The converters 314[m:1] may also decimate signals from the respective SLICs 310 [m:1] and interpolate signals from the digital signal processors 304[m:1]. Additionally, converters 314[m:1] may frame digital signals in accordance with predetermined slot assignments allocated to each of SLICs 310[m:1] and transmit the framed information in a serial data stream to digital signal processors 304[m:1]. Conversely, converters 314[m:1] may parse a serial data stream or streams received from digital signal processors 304[m:1] to transmit respective data to SLICs 310[m:1].

Terminal equipment 312[n:1] may each transmit data signals to any other terminal equipment 312[n:1], connected to the same or different line card, or to terminal equipment (not shown) which is connected to central office 316 or to any other terminal equipment in the PSTN 318, within a private network, or within a wireless network. The data signals from each of terminal equipment 312[n:1] are digitized and routed by the switching network 314 to the intended terminal equipment recipient in accordance with transmitter and receiver identification information.

Figure 5A:
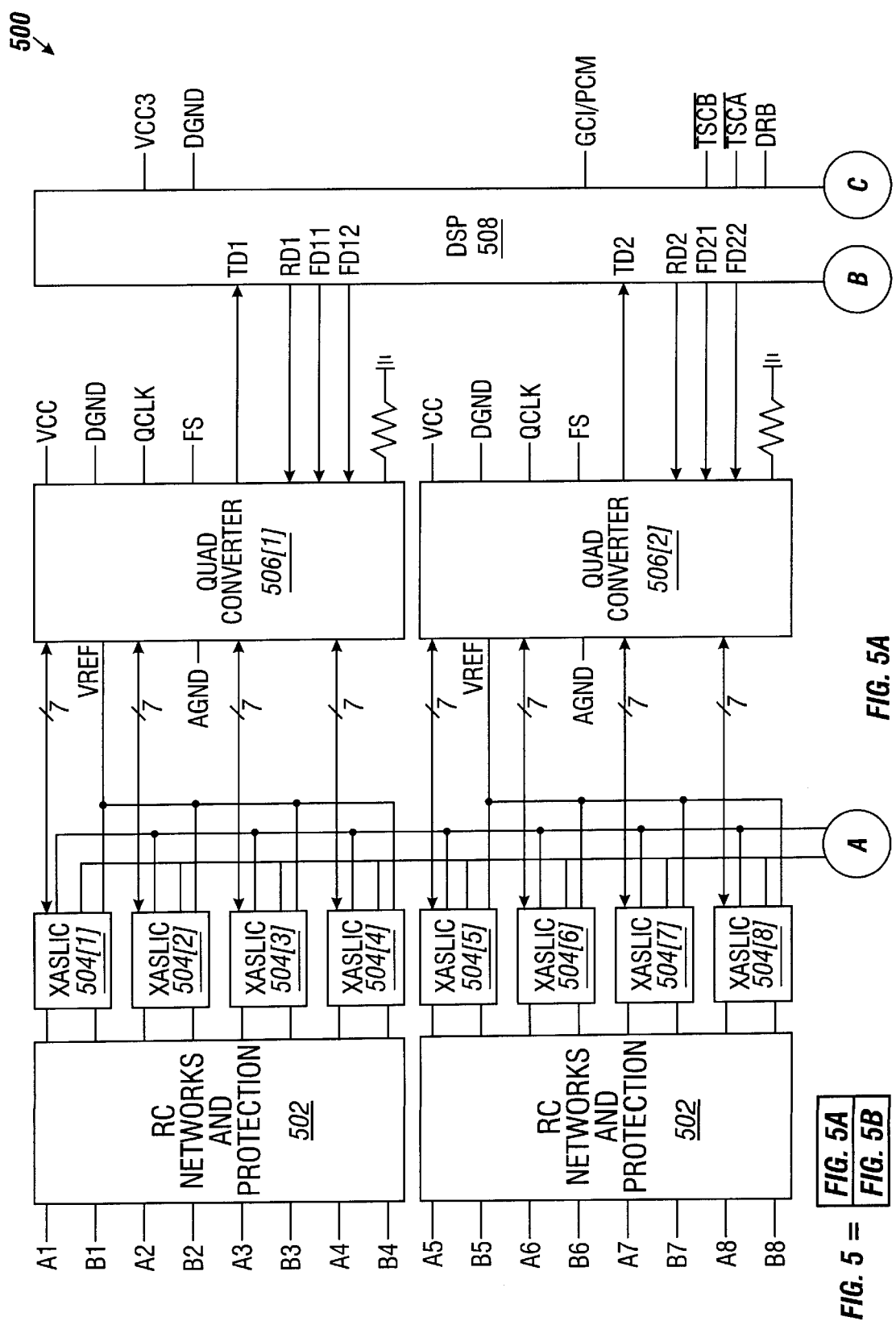
FIG. 5 illustrates an embodiment of the line card of FIG. 3.
Figure 5B:
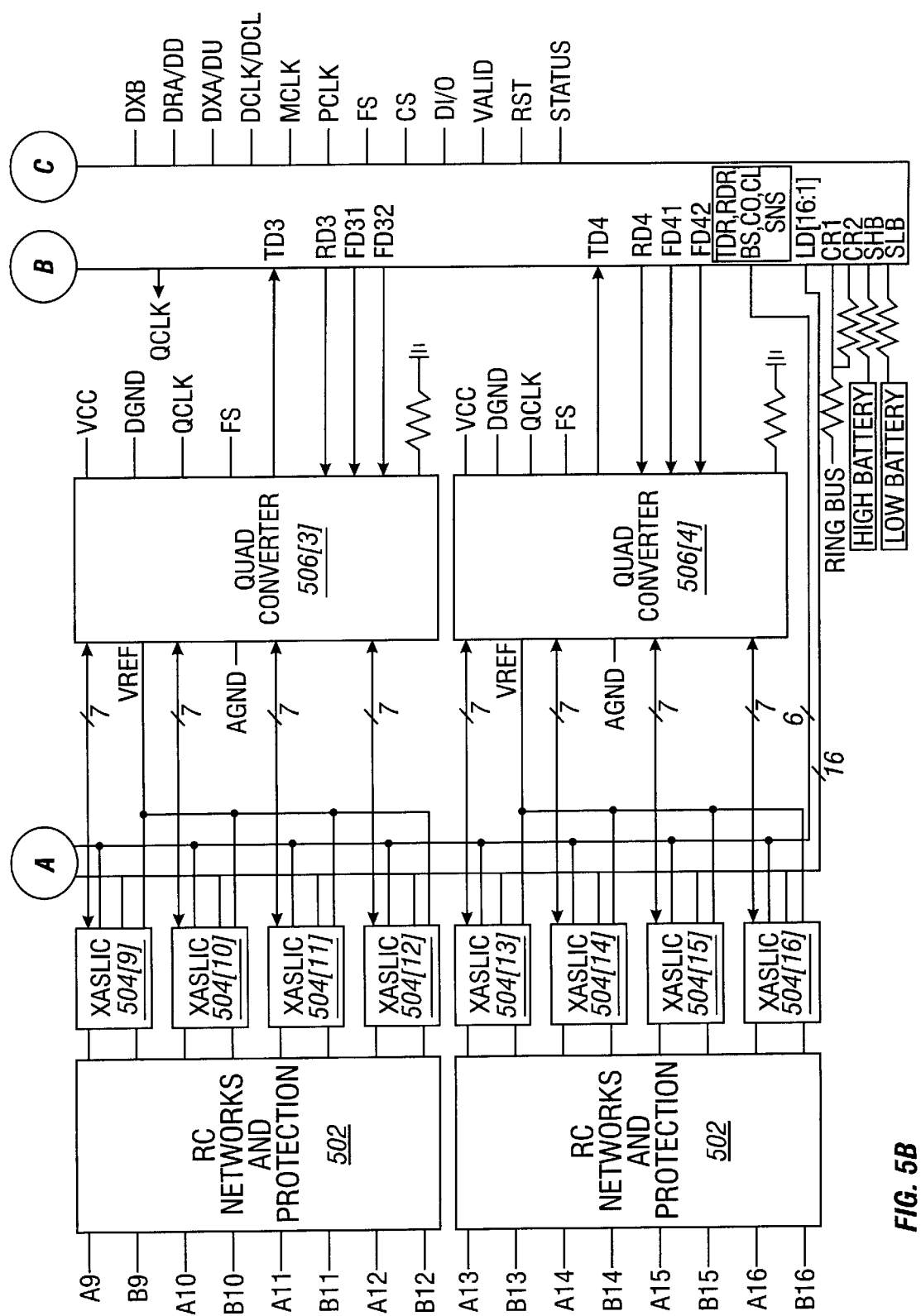

Referring to FIG. 5, one embodiment of each of the respective line cards 308[m:1] is sixteen channel line card 500 which may terminate 16 separate subscriber loops (not shown) such as subscriber loops 302[n:1] where "n" equals 16. Each of the A and B conductors, A[16:1] and B[16:1], are coupled through RC networks and protection circuitry 502. The RC networks and protection circuitry 502 provide an interface between terminal equipment 312[16:1] and subscriber line interface circuits (XASLICs) 504[16:1], respectively. The RC networks and protection circuitry 502 prefilter input signals received from connected terminal equipment and provide, for example, over current protection for the line card 500. Respective current sense resistors in series between the A and B conductors of each subscriber loop and terminal equipment allow Ia and Ib current samples to be taken by an XASLIC.

The XASLICs 504[16:1] represent an embodiment of SLICs 310[m:1] (FIG. 3), respectively. Subscriber loop 302[x] data, such as AC signal voltage Vab_AC, DC bias voltage Vab_DC and currents at the subscriber loop A and B conductors, Ia and Ib, respectively, is sensed by each of the XASLICs 504[16:1]. XASLICs 504[16:13], XASLICs [12:9], XASLICs[8:5], and XASLICs[4:1] transmit analog output signals representative of the sensed subscriber loop parametric information to quad converters 506[4:1], respectively. Additionally, XASLICs 504[16:1] receive analog data signals, such as voice signals, a dial tone signal, ringing signals, a DC feed control signal, and a reference voltage, from a connected one of quad converters 506[4:1]. These data signals are superimposed upon a DC bias voltage determined by the DC feed control signal and transmitted over a subscriber loop to terminal equipment. The respective DC feed control signals dictate the polarity of DC bias voltage and the magnitude of DC feed current supplied to the subscriber loops 302[16:1] by each of the XASLICs 504 [16:1], respectively. The DC feed control signals ensure that power supplied to respective subscriber loops 302[16:1] remains within the power envelope dictated by regional specifications and illustratively shown in FIG. 4.

In one embodiment, each of the converters 314[m:1] (FIG. 3) is divided into four quad converters 506[4:1]. Each of the quad converters 506[4:1] provides an A/D and D/A conversion interface between four of the XASLICs 504 [16:1] and the digital signal processor 508. AC input signals from XASLICs 504[16:1] such as voice signals are sampled with 6 bit resolution at a frequency of 4 MHz and decimated to reduce the sampling frequency to 32 kHz. Three data signals representing Vab, Ia, and Ib from each of the sixteen supported subscriber loops are all sampled by respective A/D converters (not shown) with 10 bit resolution at a sampling frequency of 4 kHz. Each of the converters 314 [m:1] also samples loop currents in respective connected subscriber loops 302[n:1] when external ringing is switched in. Additionally, Ia is used as an input to thermal shutdown circuitry to detect and respond to potentially dangerous current levels on a subscriber loop. Each of the quad converters 506[4:1] place all of the converted input signals from all sixteen XASLICs 504[16:1] into respective predetermined slots in a 4 MHz digital serial data stream. The 4 MHz serial data streams from each of the quad converters 506[4:1] are received and processed by the digital signal processor 508.

The quad converters 506[4:1] also each receive three 4 MHz serial digital data streams from the digital signal processor 508 which include information for the subscriber loops 302[16:1] supported by the quad converters 506[4:1] and for range control for the respective Vab, Ia, and Ib data input signals to the A/D converters. The range control allows resolution of particular data to be increased or decreased. The digital signal processor 508 output serial data streams include predetermined slots with signal data, such as voice signal data, DC feed control data, and longitudinal voltage compensation data for each of subscriber loops 302[16:1]. These serial data streams are converted into parallel data, parsed for transmission to each of the XASLICs[16:1] from predetermined slots, and routed to respective linear interpolators (not shown). The respective DC feed signal data for each of subscriber loops 302[n:1] is also parsed and routed to respective DC feed linear interpolators (not shown) to increase the sampling frequency from 250 Hz to 256 kHz. The digital output signals from each DC feed linear interpolator are converted into an analog DC feed control signal for respective XASLICs 504[16:1]. XASLICs 504[16:1] provide DC current feed to subscriber loops 302[16:1] respectively, in response to DC current feed levels indicated by the respective DC feed control signal from digital signal processor 508. Four bit resolution longitudinal voltage compensation data signals from digital signal processor 508 for each of subscriber loops 302[16:1], respectively, is also parsed and routed to a D/A converter. The corresponding output analog signals are transmitted to the respective XASLICs 504[16:1] connected to subscriber loops 302 [16:1], respectively.

Figure 6A:
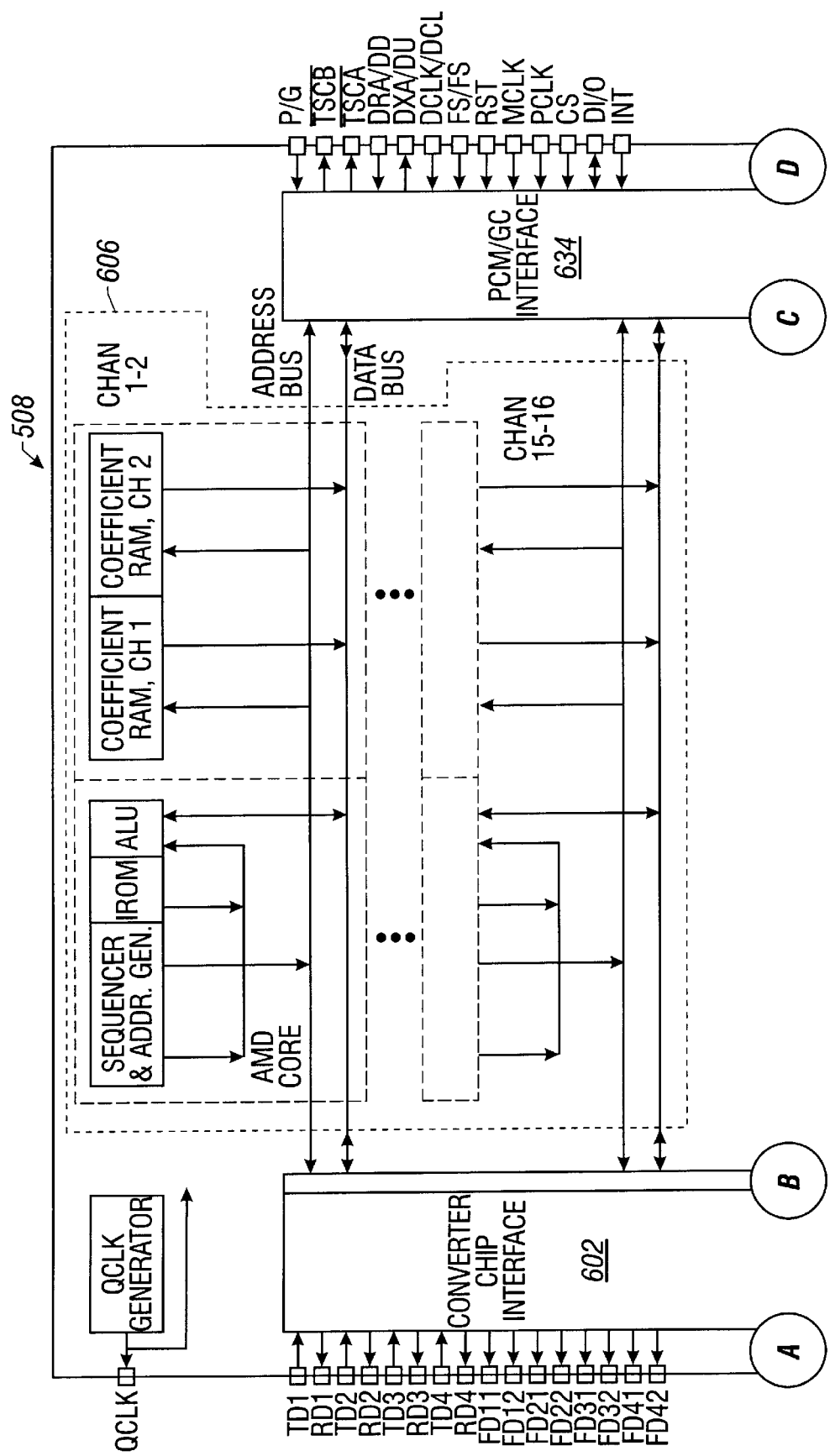
FIG. 6 illustrates an embodiment of the digital signal processor of FIG. 3.
Figure 6B:
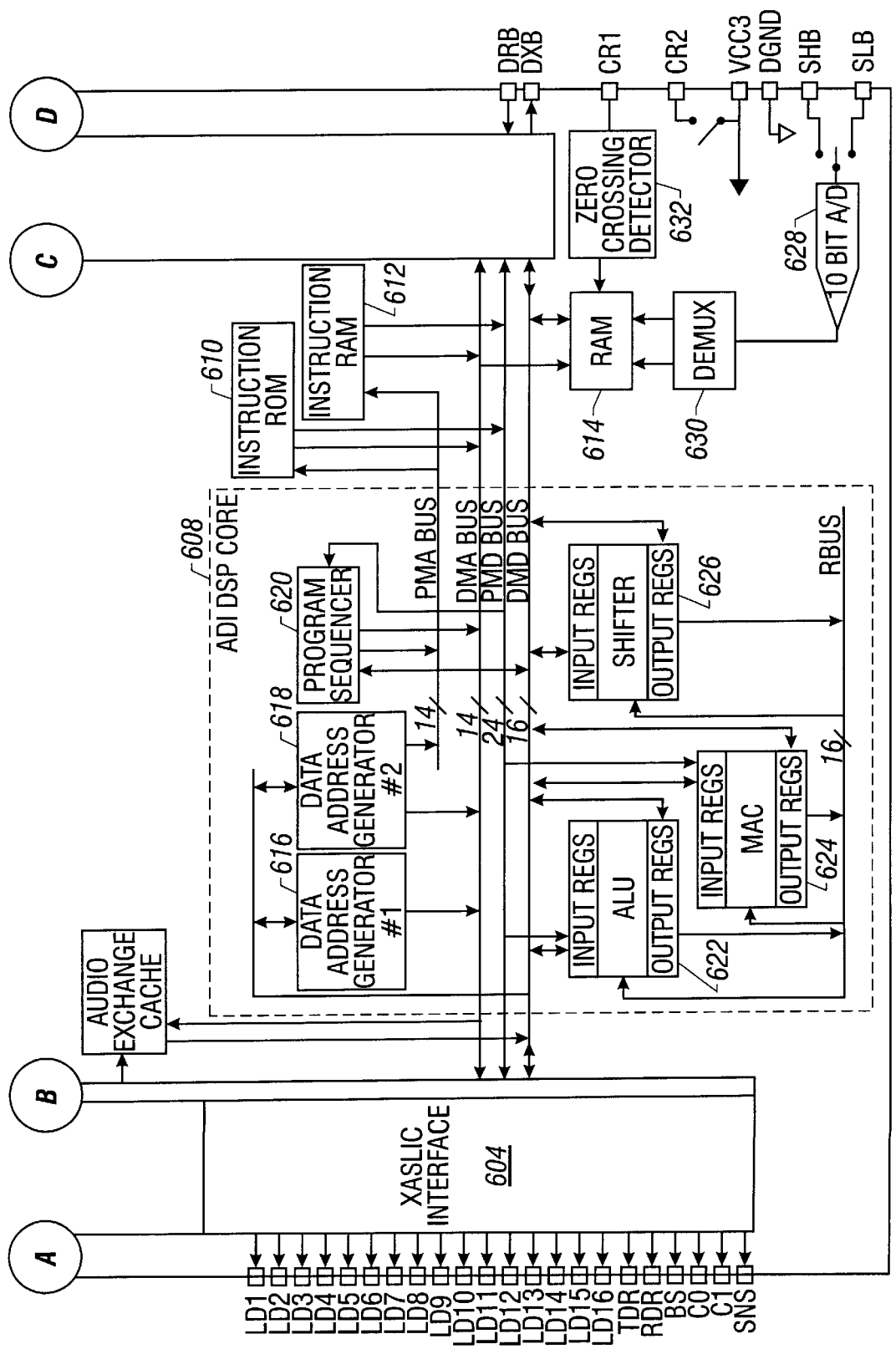

Referring to FIG. 6, the digital signal processor 508 interconnects to the quad converters 506[4:1] through output terminals TD[4:1], RD[4:1], FD11, FD12, FD21, FD22, FD31, FD32, FD41, and FD42 of converter chip interface 602. Converter chip interface 602 processes the serial data streams from each of quad converters 506[4:1] to retrieve information from each predetermined slot in the serial data streams. Thus, information from each of XASLICs 504 [16:1] is available for individual processing by audio processor core 606 and digital signal processor core 608. Converter chip interface 602 also assigns information for respective XASLICs 504[16:1] and quad converters 506 [4:1] from audio processor core 606 and digital signal processor core 608 to respective predetermined time slots in the 4 MHz digital output serial data streams. Each of quad converters 506[4:1] receives three 4 MHz digital data streams from digital signal processor 508, one for audio signals and two for DC feed control and the A/D range control. Digital signal processor 508 also programs a register (not shown) of each of XASLICs 504[16:1] with output signals LD[16:1], respectively, TDR, RDR, BS, C0, C1, and SNS transmitted through the XASLIC interface 604. The register (not shown) controls XASLIC modes such as standby, active, and ringing modes. XASLIC interface 604 inserts register information in predetermined slots for each of respective XASLICs 504[16:1]. Audio processor core 606 provides digital audio signal processing.

The digital signal processor core 608 processes instructions stored in instruction ROM (read only memory) 610 and instruction RAM (random access memory) 612. Data addresses are generated by data address generator #1 616 and data address generator #2 618. The program sequencer 620 provides program execution timing. To perform various arithmetic operations, digital signal processor core 608 also includes an arithmetic logic unit 622, a multiply, accumulate, and carry unit 624, and a shifter 626, each -with respective input and output registers.

To utilize accurate, real time central office 306 battery voltage levels in various calculations, central office 306 high and low battery voltages are sampled from input terminals SHB and SLB, respectively. The voltages at input terminals SHB and SLB are sampled by 10 bit A/D converter 628, demultiplexed by demux 630, and stored in RAM 614 as Vbat. Ringing voltage signals from the central office 306 ring generator 402 (FIG. 4) are received at input terminals CR1 and CR2. Zero crossing detector 632 provides data to RAM 614 representing zero crossings of external ringing signals generated by central office 306. Digital signal processor operates on 5 V supplied by the central office 306 at input terninal VCC3. The digital signal processor core 608 and audio processor core 606 transmit to and receive communication signals from the central office 306 (FIG. 3). These communication signals are converted to and from PCM signal format by the PCM/microprocessor interface 634. The PCM/microprocessor interface 634 supports standard direct digital information transfer of, for example, digital filter coefficients, between the line card 508 and central office 306.

Figure 7:
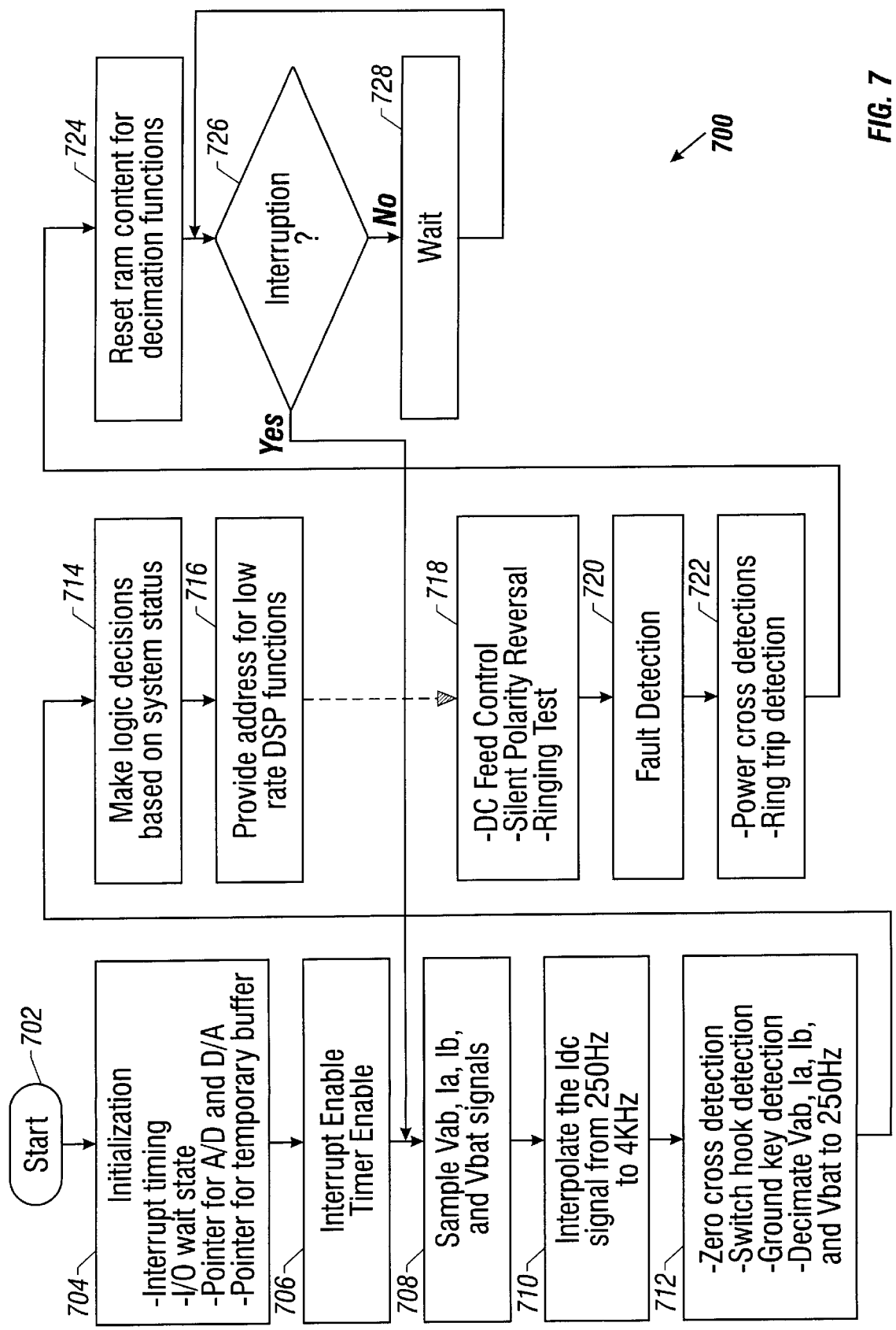
FIG. 7 illustrates an execution timing flow diagram of the digital signal processor of FIG. 6.

Referring to FIG. 7, the digital signal processor 508 executes an endless loop of operation modules. The computer program execution timing of the digital signal processor core 608 proceeds as illustrated in the signal processing flow 700. When the digital signal processor core 608 is started at operation 702, an initialization module 704 sets up interrupt timing so that signal processing flow 700 executes at a predetermined rate. I/O wait states, pointers for the A/D and D/A module 708, and a pointer for a temporary buffer are also set up in operation 702. After initialization, interrupts and a timer are enabled as shown in operation 706. Next the A/D and D/A module 708 is executed and parametric data, Vab, Ia, and Ib, sampled by each of the XASLICs 504[16:1] (FIG. 5) from each of the respective subscriber loops 302[16:1] and Vbat are retrieved for use by the digital signal processor core 608 in subsequent processing. In operation 710, an interpolator is set up to interpolate 250 Hz data from the digital signal processor 508 to 4 kHz data.

The digital signal processor core 608 then proceeds in subscriber loop status and decimation operation 712 to successively execute zero cross detection, switch hook detection, and ground key detection modules. The zero cross detection module detects the voltage and current zero crossing of an integral ringing signal supplied by the line card 500. For external ringing, ring relays of the line card 508 disconnect any ringing signals on a subscriber loop 302[x] from a ring generator 402 (FIG. 4) of the central office 306 after a ring trip is detected by power cross and ring trip detection module 722. The ring generator 402 (FIG. 4) is preferably not disconnected after a ring trip detection until a current-zero crossing is detected to avoid damaging the ring relays. The switch hook detection module detects loop start signaling on- and off-hook transitions and detects make and break signals (dial pulses). Switch hook detection is further illustratively described in U.S. patent application, Ser. No. 08/870,892, by Yan Zhou, entitled "Switch Hook Status Determination In A Communication System", filed concurrently with this patent application and incorporated by reference in its entirety. The ground key detection module executed by the digital signal processor core 608 in subscriber loop status and decimation operation 712 detects ground start signaling. After executing the zero cross detection, switch hook detection, and ground key detection modules, the 4 kHz sampled data Vab, Ia, and Ib for each subscriber loop, and Vbat data is decimated to a 250 Hz sampling frequency.

Proceeding to system status operation 714, digital signal processor core 608 interprets the zero crossing detection, switch hook detection, and ground key detection status information obtained in subscriber loop status and decimation operation 712 and takes appropriate action such as identifying and forwarding to the central office 306 a number dialed by terminal equipment based upon the number of make and break connections determined by the switch hook detection module, supplying a dial tone to terminal equipment that has seized a subscriber loop, and disconnecting a ringing signal at a zero crossing after a ring trip.

Figure 8:
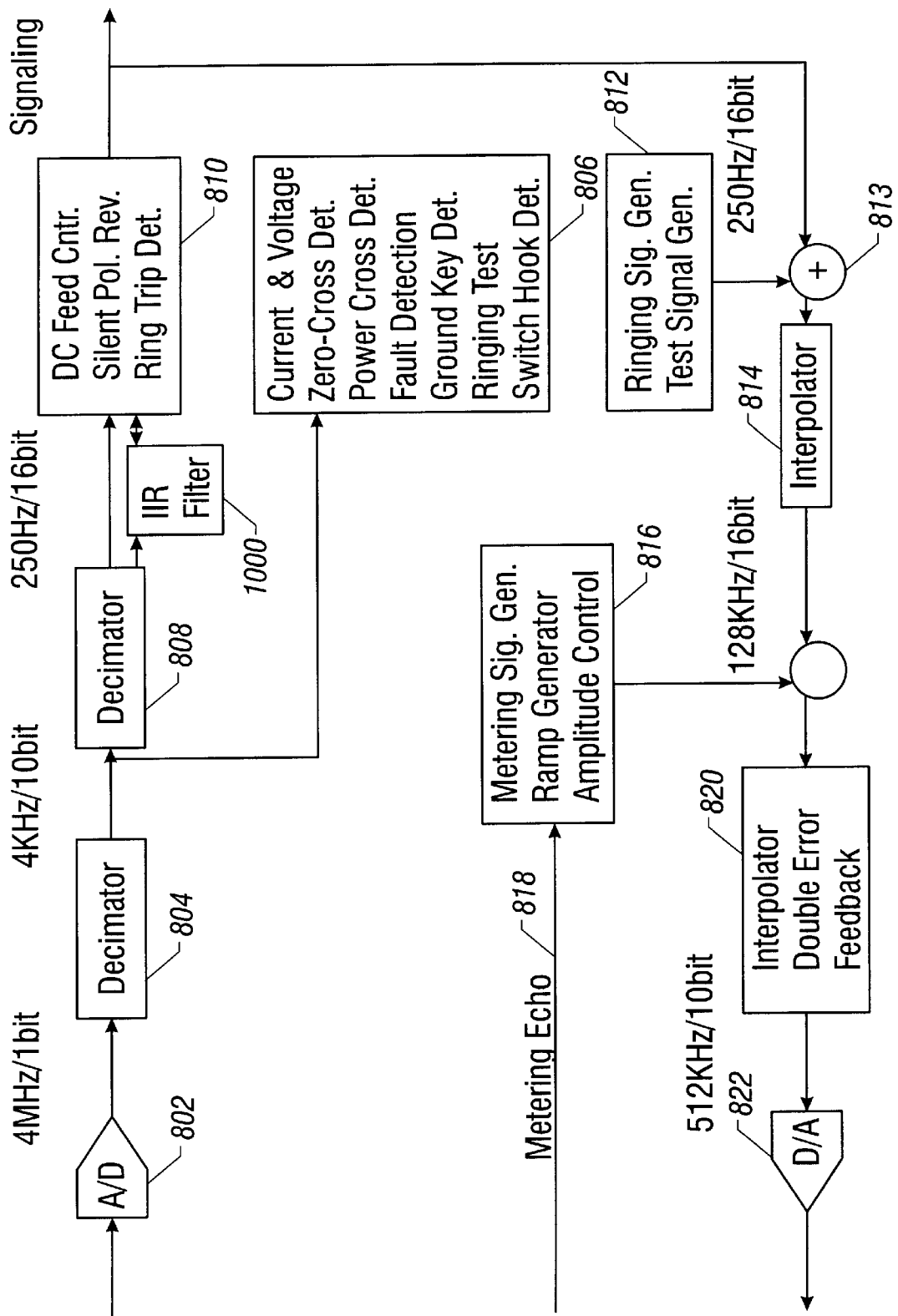
FIG. 8 illustrates input and output data sampling frequencies utilized by the line card of FIG. 5 for each supported subscriber loop.

In one embodiment of the signal processing flow 700, the digital signal processing DC feed control, silent polarity reversal, and ring trip detection functions in the DC feed control module 718 and power cross and ring trip detection module 722 may be performed at a rate relatively lower to other functions while achieving satisfactory performance. Referring to FIG. 8, input and output data sampling frequencies utilized by digital signal processor core 608 for each of supported subscriber loops 302[16:1] are illustrated. As described above, each of the quad converters 506[4:1] performs an A/D conversion 802 on signals received from connected XASLICs 504[16:1] and provides a 4 MHz serial data stream to digital signal processor 508. Decimator 804 of converter chip interface 602 decimates the 4 MHz serial data stream to a sampling frequency of 4 kHz and provides a 10 bit parallel output signal to digital signal processor core 608 which contains the sampled parametric data for each of the supported subscriber loops 302[16:1]. Current and voltage zero cross detection, switch hook detection, and ground key detection modules of operation 712 (FIG. 7), the power cross detection module of operation 722 (FIG. 7), and short circuit detection module of operation 720 (FIG. 7), corporately shown in operation 806, operate at a 4 kHz rate and utilize the 4 kHz sampled parametric data. The 4 kHz data stream is further decimated to a sampling frequency of 250 Hz by decimator 808 of the converter chip interface 602. Corporately shown in operation 810, the DC feed control and silent polarity reversal modules of operation 718 (FIG. 7) operate at 250 Hz and utilize the 4 KHz and 250 Hz sampled data. The DC feed control module is illustratively described in U.S. patent application, Ser. No. 08/870,895, filed concurrently with this patent application, entitled "Direct Current Feed With Line Status Change Adaptation In A Communication System" by Yan Zhou, and incorporated herein by reference in its entirety and U.S. patent application, Ser. No. 08/870,894, filed concurrently with this patent application, entitled "Silent Polarity Reversal In A Communication System" by Yan Zhou, and incorporated herein by reference in its entirety.

Quad converters 506[x] interpolate DC feed control signals, silent polarity reversal signals, and any ringing and test signals from central office 306 ring and test signal generators 812 from adder 813 to a 128 kHz sampling frequency, 16 bit data stream with interpolator 814. Output signals from metering signal, ramp generator, and amplitude control operation 816 are added by adder 815 to the output data signals of 814. Operational block 816 is illustratively described by Zhou, et al., "Metering Signal Level Control Circuit," U.S. Pat. No. 5,452,345. These composite output signals are for a single subscriber loop 302[x] with each of subscriber loops 302[16:1] being processed serially. For each subscriber loop 302[x], the digital composite output signal from adder 815 is interpolated to a 512 kHz sampling frequency, 10 bit output signal by the single error feedback interpolator 820 in a quad converter 506[x] and converted into an analog signal with the D/A converter 822 of quad converter 506[x] for input to the XASLIC 504[x] connected to the subscriber loop 302[x] just processed.

The digital signal processing DC feed control, silent polarity reversal, and ring trip detection functions in the DC feed control module 718 and power cross and ring trip detection module 722 are low rate functions performed at 250 Hz, one-sixteenth the rate of the subscriber loop status and decimation operation 712 functions. Accordingly, during a single pass through signal processing flow 700, these 250 Hz low rate functions are only executed for a single subscriber loop 302[x] and are executed for each of subscriber loops 302[16:1] only once every 16 passes. The channel identification module 716 identifies which of subscriber loops 302[16:1] is to be processed during the next execution of operations 718, 720, and 722. After identification, the feed control module 718 provides DC feed control, silent polarity reversal, and a ringing test for the identified subscriber loop 302[x].

Referring to FIG. 7, after exiting the feed control module 718, fault detection module 720 determines whether a fault exists in subscriber loop 302[x].

Figure 4:
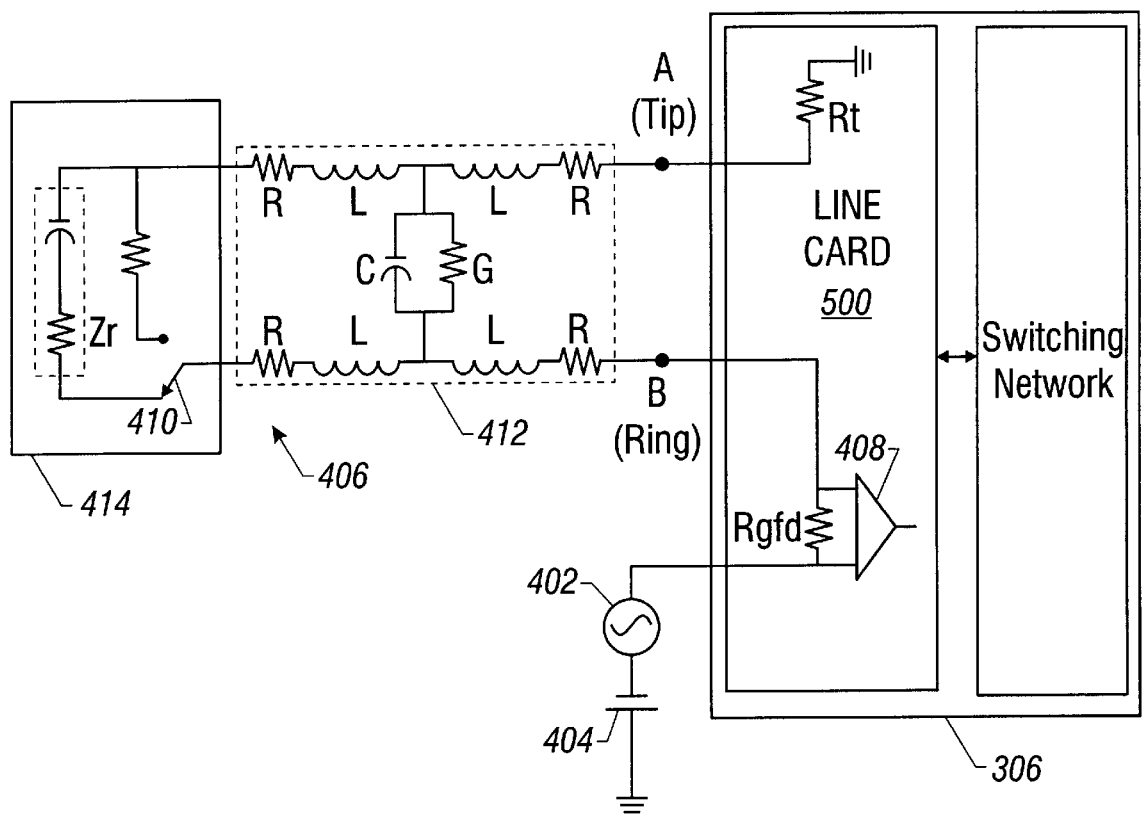
FIG. 4 illustrates a ring voltage detector.
Figure 9:
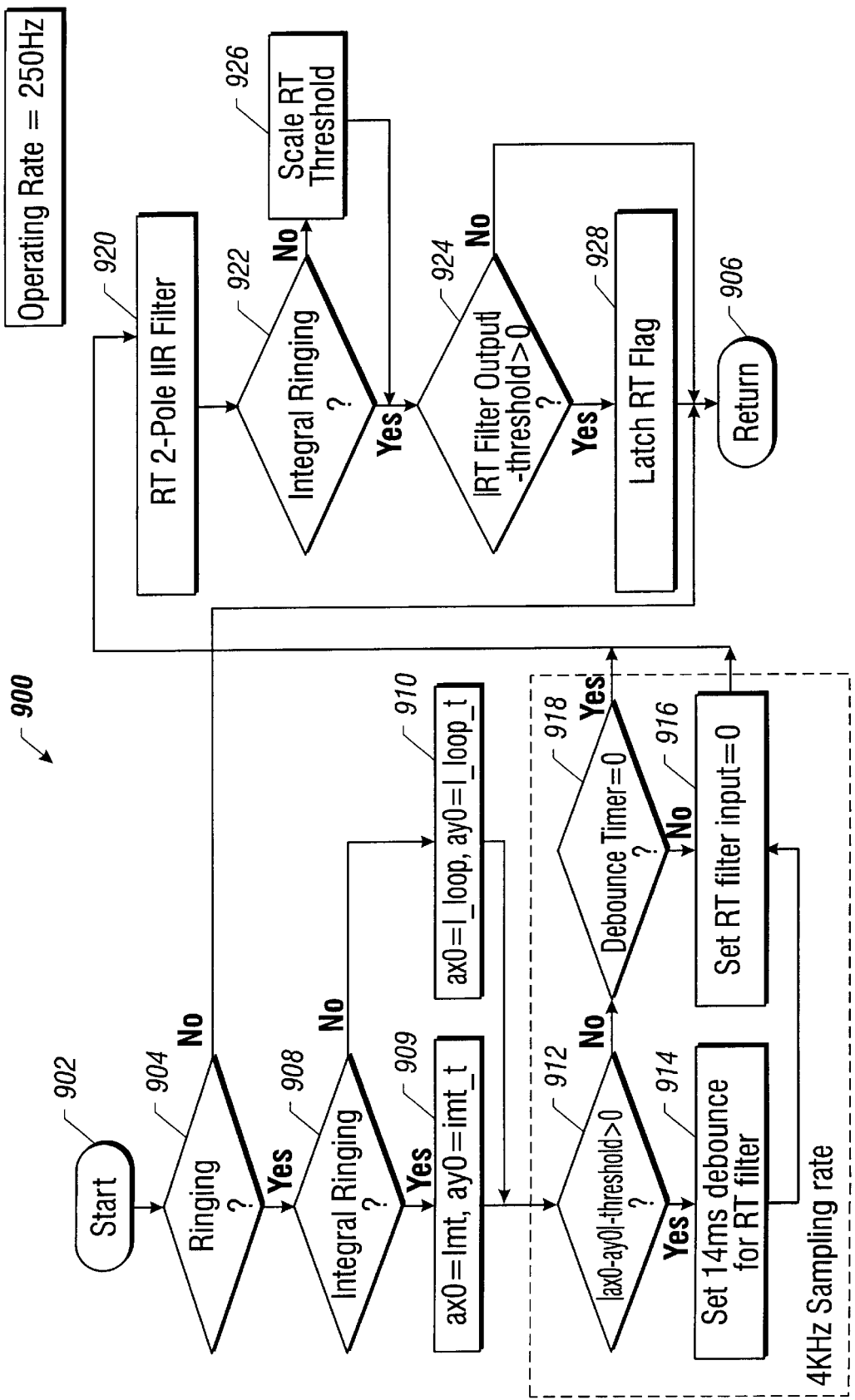
FIG. 9 illustrates an embodiment of the ring trip detection module of the digital signal processor execution timing flow diagram of FIG. 7.

Referring to FIGS. 4 and 9, ring trip detection module 900 is executed by digital signal processor core 608 for each of subscriber loops 302[16:1] in turn. Ring trip detection is discussed with reference to subscriber loop 302[x] which represents each of subscriber loops 302[16:1]. Metallic current Ia-Ib (Imt) and loop current (I_loop) are determined by digital signal processor core 608 from currents Ia and Ib and the voltage across Rgfd, respectively, as sensed by XASLIC 504[x]. The decimator 804 (FIG. 8) decimates Imt and I_loop to a sampling rate of 4 kHz, respectively. After digital signal processor core 608 accesses the ring trip detection module 900 from memory and begins execution at the start operation 902, ring trip detection module 900 determines in operation 904 whether a ringing signal is being applied to subscriber loop 302[x] by accessing the contents of a ring status register (not shown). If a ringing signal is not being applied, ring trip detection module 900 proceeds directly to operation 906 and returns to signal processing flow 700 to begin executing the power cross module in the power cross and ring trip detection module 722.

If a ringing signal is being applied to subscriber loop 302[x], operation 908 determines whether the ringing signal is being generated internally by line card 500 or generated by central office 306. If an integral ringing signal is being applied, the ring trip detection module 900 assigns variables ax0 to equal Imt and ay0 to equal Imt_t, the most previous sampled Imt. Otherwise, the ring trip detection module 900 assigns variables ax0 to equal I_loop and ay0 to equal I_loop_t, the most previous sampled I_loop.

Next, in operation 912, a predetermined short circuit threshold is subtracted from the absolute value of ax0 minus ay0. Thus, operation 912 determines whether the current in subscriber loop 302[x] has changed by more than the predetermined short circuit threshold. The predetermined short circuit threshold is chosen to detect a 4 kHz sampled current change due to a short circuit condition at subscriber loop 302[x] while discriminating against current changes due to a ringing signal. In one embodiment, the predetermined short circuit threshold is chosen to be 50 mA. The largest current change in a ringing signal occurs near a current zero crossing. Although, the magnitude of the ringing signal current is large, the ringing signal current frequency generally does not exceed about 67 Hz. Thus, when using 4 kHz sampled current signals, the largest ringing signal current change over a 0.25 ms does not exceed 50 mA. If abs(ax0-ay0)-(predetermined short circuit threshold) is greater than zero, operation 914 'debounces' for a predetermined maximum short circuit duration time by setting a 'debounce timer' that decrements during every pass through ring trip detection module 900 until the maximum short circuit duration time has elapsed. The debounce counter in operation 914 is reset to 14 ms every time the outcome of operation 912 is true. During this period of time, the IIR filter 920 is prevented from falsely detecting a ring trip by setting the input data for the IIR filter 920 to zero and resetting IIR filter 920 state variables to obtain a zero output in operation 916. The maximum short circuit duration time is generally based on a regional requirement such as the 12 ms short duration short circuit discrimination requirement of the LSSGR specification section 6, issue 3, September 1991. Accordingly, in one embodiment, the maximum short circuit duration time is 14 ms to provide a small extra margin.

Figure 10:
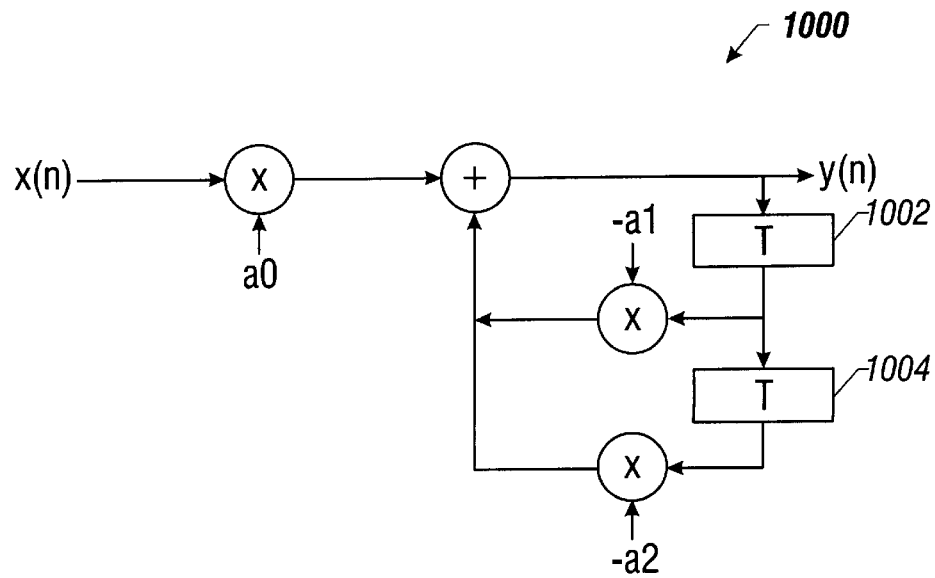
FIG. 10 illustrates an embodiment of an infinite impulse response filter for the ring trip detector of FIG. 4 and the ring trip detection module of FIG. 9.

Referring to FIG. 10, IIR filter 1000 is one embodiment of the IIR filter 920 (FIG. 9). The discrete output, y[n], equals 0.996094 * y[n−1] plus 0.941406 * [y[n−1]−y[n−2]] plus 0.00390625 * x[n], where delay operations 1002 and 1004 equal, y[n−1] and [y[n−1]−y[n−2]], respectively.

Referring to FIG. 9, if the outcome of operation 912 is false and operation 918 determines that the predetermined maximum short circuit duration time has elapsed, the two pole IIR filter 920 having a z-domain transfer function, $H(z)=a0/(1+a1/z+a2/z*z)$, is loaded with programmable coefficients a0=0.00390625, a1=1.9375, and a2=0.941406. In operation 924, the absolute value of the output data signal, abs(y(n)) of IIR filter 920 is compared to a predetermined, programmable threshold chosen to allow ring trip detection module 900 to detect an actual ring trip while discriminating against noise. If the a ring trip has occurred, the abs(y(n)) will rise above the predetermined threshold within 150 ms. If an integral ringing signal is being applied to subscriber loop 302[x], the threshold in operation 924 is set to 10 mA. If the ringing signal is external, the current will be higher than an integral ringing signal current, and the ring trip threshold is scaled in operation 926 in accordance with circuit gain of external ringing circuitry. For example, the ring trip threshold may be scaled to one-half to one-third of the internal ring trip threshold.

If in operation 924, abs(y(n)) rises above the threshold, a ring trip has occurred, and a ring trip flag is set and latched in operation 928. The ring trip detection module 900 then returns to return operation 906 to resume execution of the signal processing flow 700, as described above. If the outcome in operation 924 is false, no ring trip has occurred. Ring trip detection module 900 then proceeds to return operation 906.

Referring to FIG. 7, after exiting the power cross and ring trip detection module 722, RAM contents are reset in operation 724 in anticipation of subsequent decimation functions. Operation 726 detects an interruption from a system timer (not shown) which occurs at the operating frequency of signal processing flow 700, which in one embodiment is 4 kHz. If the interruption is not received, signal processing flow 700 enters a wait state in operation 728 until the interruption is received. During the wait state, digital signal processing core 608 may perform other functions such as processing audio signals.

While the invention has been described with respect to the embodiments and variations set forth above, these embodiments and variations are illustrative and the invention is not to be considered limited in scope to these embodiments and variations. For example, various sampling rates are indicated which may be changed in accordance with factors such as the processing speed of the digital signal processor core 608. Additionally, it will be apparent to those of ordinary skill in the art that many of the functions of communication system 300 may be implemented in hardware or software. Additionally, filter coefficients and other variables may be changed to achieve ring trip detection with short duration short circuit discrimination. Also, circuitry may be used to establish a wireless link between each line card 308[m:1] and a central office to provide, for example, remote data and control access. Furthermore, redundant line cards and/or redundant subscriber loop interface circuits may be implemented and switched in when necessary to replace corresponding defective circuitry. Accordingly, various other embodiments and modifications and improvements not described herein may be within the spirit and scope of the present invention, as defined by the following claims.

What is claimed is:

1. A method comprising the steps of:

sampling a signal at a time, t0, and at a later time, t1;

calculating any change between an attribute of the signal sampled at time t0 and the signal attribute sampled at time t1;

comparing the change between an attribute of the signal sampled at time t0 and the signal attribute sampled at time t1 to a first predetermined threshold value;

if any change in the compared signal attribute exceeds the first predetermined threshold, preventing processing of the signal for at least a predetermined amount of time and after elapse of the predetermined amount of time and if any change in the compared signal attribute does not exceed the first predetermined threshold, processing the signal with a signal processor to detect a change in an impedance of the transmission line.

2. The method as in claim 1 further comprising the step of:
comparing the processed signal with a second predetermined threshold to detect a minimum degree of change in the transmission line impedance.

3. The method as in claim 2 further comprising the step of:
prior to comparing the processed signal with the second predetermined threshold, determining if the signal is an integral ringing signal generated by a line card connected to the transmission line or an external ringing signal generated external to the line card; and
adjusting the second predetermined threshold according to the determined ringing signal type.

4. The method as in claim 2 wherein the signal attribute is a direct current bias level of the signal, and the step of comparing the processed signal with a second predetermined threshold further comprises the step of:
comparing the processed signal with a second predetermined threshold to detect an impedance change in the transmission line which indicates a switch hook on-hook to off-hook transition.

5. The method as in claim 1 wherein the step of preventing processing of the signal further comprises the steps of:
setting an input signal to a filter to zero.

6. The method as in claim 5 wherein the filter is an infinite impulse response digital filter, and the step of preventing further comprises the steps of:
resetting state variables of the infinite impulse response digital filter to obtain an approximately zero output signal from the infinite impulse response digital filter.

7. The method as in claim 1 wherein the step of sampling the signal comprises the step of:
sampling a signal on a subscriber loop with line card circuitry of a communication system.

8. The method as in claim 1 wherein the step of sampling the signal comprises the step of:
converting the signal from an analog signal to a digital signal.

9. The method as in claim 1 further comprising the step of:
determining if the signal is an integral ringing signal or an external ringing signal;
wherein, if the signal is an integral ringing signal, the step of sampling comprises the steps of:
sampling metallic currents on a transmission line; and
wherein, if the signal is an external ringing signal, the step of sampling comprises the steps of:
sampling a loop current on the transmission line.

10. The method as in claim 1 wherein the predetermined amount of time is an amount of time sufficient to discriminate against a short duration short circuit signal at a transmission line, the short circuit signal having a magnitude greater than the first predetermined threshold value.

11. The method as in claim 1 wherein the short duration short circuit signal endures for a maximum of twelve milliseconds, and the predetermined amount of time is approximately fourteen milliseconds.

12. The method as in claim 1 further comprising the steps of:
executing the steps of claim 1 respectively for a plurality of signals from respective subscriber loops with circuitry disposed on a line card of a communication system.

13. A method of detecting a ring trip in a communication system with subscriber loop short circuit discrimination comprising the steps of:
applying a ringing signal including a direct current bias voltage to a subscriber loop of the communication system;
calculating a current signal change between a current signal sampled at a first time and the current signal sampled at a second time in the subscriber loop;
determining if the calculated current signal change exceeds a first predetermined threshold during a predetermined amount of time;
if the current signal change exceeds the first predetermined threshold, preventing the current signal from being filtered by a low pass ring trip detection filter for a predetermined amount of time; and
after the predetermined amount of time and if the current signal change does not exceed the first predetermined threshold, determining if the current signal change exceeds a second predetermined threshold.

14. The method as in claim 13 wherein the first predetermined threshold corresponds to a current magnitude which is less than a short duration subscriber loop short circuit current change and greater than a ring trip current change during the predetermined amount of time.

15. The method as in claim 14 wherein the first predetermined threshold is 50 mA and the predetermined amount of time is 14 milliseconds.

16. The method as in claim 13 wherein the second predetermined threshold is 1 mA.

17. The method as in claim 13 further comprising the step of:
setting the second predetermined threshold in accordance with a source of the applied ringing voltage.

18. The method as in claim 17 wherein if the source of the applied ringing voltage is a line card of the communication system, the method further comprises the step of:
setting the second predetermined threshold to 10 mA.

19. The method as in claim 17 wherein if the source of the applied ringing voltage is a central office ringing signal generator, the method further comprises the step of:
setting the second predetermined threshold to a value less than a ring trip current change.

20. The method as in claim 13 wherein the low pass ring trip detection filter is a two pole infinite impulse response filter.

21. The method as in claim 13 wherein the step of preventing the detected current signal from reaching a low pass ring trip detection filter comprises the step of:
setting an input signal to the low pass ring trip detection filter to about zero and setting state variables of the low pass ring trip detection filter to obtain about a zero output signal.

22. The method as in claim 13 wherein the steps of calculating a current signal change, determining if the calculated current signal change exceeds a first predetermined threshold, preventing a detected current signal from reaching a low pass ring trip detection filter, and determining if the detected current signal exceeds a second predetermined threshold are implemented as code in a ring trip detection module stored in a memory coupled to a processor, the method further comprising the step of:
executing the ring trip detection module with the processor.

23. A communication system comprising:

circuitry for successively sampling a signal on a subscriber loop at a time, t0, and at a later time, t1;

a line card having a processor and a memory, the memory storing code for execution by the processor, the code including instructions for calculating a change in successive samples of the signal to detect a short circuit of the subscriber loop while generally discriminating against a ring trip of the subscriber loop and for low pass filtering the sampled signal to detect a ring trip unless the short circuit of the subscriber loop is detected.

24. The communication system as in claim 23 further comprising:

terminal equipment having a switch hook in the subscriber loop which when off hook corresponds to a ring trip.

25. The communication system as in claim 23 wherein the code further includes instructions to compare a calculated change in successive samples of the signal with a predetermined threshold to detect the short circuit of the subscriber loop.

26. The communication system as in claim 23 wherein the code further includes instructions to compare an output result of the low pass filter operation with a predetermined threshold to detect a DC bias current change in the subscriber loop indicating the ring trip condition.

27. The communication system as in claim 26 wherein the code further includes instructions to adjust the predetermined threshold in accordance with integral and external ringing signals.

28. A communication system comprising:

a subscriber line interface circuit having input terminals coupled to respective terminal pairs of a subscriber loop;

a loop current sensing circuit coupled to a ring generator terminal and a subscriber loop terminal;

an analog to digital converter circuitry coupled to output terminals of the subscriber line interface circuit and coupled to an output terminal of the loop current sensing circuit;

a processor coupled to the analog to digital converter for receiving subscriber loop signal data; and a memory coupled to the processor and storing code for execution by the processor, the code including instructions for calculating any change between an attribute of the signal sampled at time t0 and the attribute in the signal sampled at time t1 comparing the calculated change to a first predetermined threshold value, the signal being sampled by (i) the subscriber line interface circuit and analog to digital converter circuit if the ringing signal is an integral ringing signal or (ii) the loop current sensing circuit if the ringing signal is an external ringing signal, and, if any change in the compared signal attribute exceeds the first predetermined threshold, preventing processing of the signal for at least a predetermined amount of time;

terminal equipment coupled to the subscriber loop, wherein the code further included instructions for digitally filtering the signal after the predetermined amount of time if the signal attribute does not exceed the first predetermined threshold and comparing output data from the digital filter with a second predetermined threshold to detect a ring trip on the subscriber loop.

29. The communication system of claim 28, further comprising:

a plurality of subscriber line interface circuits having respective input terminals coupled to respective subscriber loop terminal pairs;

a plurality of loop current sensing circuits coupled to respective ring generator terminals and to respective subscriber loop terminals, wherein the respective pluralities of subscriber line interface circuits and loop current sensing circuits are coupled to the analog to digital converter circuitry.

30. The communication system of claim 28 wherein the subscriber line interface circuit, loop current sensing circuit, analog to digital converter circuitry, processor, and memory are integrated on a line card.

31. The communication system of claim 29 wherein the code further includes instructions for scaling the second predetermined threshold to detect a ring trip on the subscriber loop and not detect subscriber loop current changes attributable to non-ring trip events.

* * * * *